US008458690B2

(12) United States Patent
Zhang et al.

(10) Patent No.: US 8,458,690 B2
(45) Date of Patent: Jun. 4, 2013

(54) AUTOMATED SOFTWARE DEPLOYMENT TRIGGERED BY STATE DIFFERENCES IN DISTRIBUTED SYSTEMS

(75) Inventors: Junbo Zhang, Beijing (CN); Tony Yip, Beijing (CN); Shu Zhang, Beijing (CN); Lois Wang, Beijing (CN); Tianxiang Chen, Beijing (CN); Eric Zheng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 12/431,785

(22) Filed: Apr. 29, 2009

(65) Prior Publication Data
US 2010/0281473 A1 Nov. 4, 2010

(51) Int. Cl.
*G06F 9/44* (2006.01)
(52) U.S. Cl.
USPC .......................................................... 717/171
(58) Field of Classification Search
USPC ................. 717/101, 178, 170, 172, 174–175, 717/120, 169; 709/201, 221, 207, 223; 713/1; 714/1; 726/1, 22; 707/10
See application file for complete search history.

(56) References Cited

U.S. PATENT DOCUMENTS

| 6,353,926 | B1* | 3/2002 | Parthesarathy et al. ....... 717/170 |
| 6,785,380 | B2 | 8/2004 | Ribera |
| 7,093,004 | B2 | 8/2006 | Bernardin et al. |
| 7,134,090 | B2 | 11/2006 | Kodosky et al. |
| 7,200,530 | B2 | 4/2007 | Brown et al. |
| 7,752,214 | B2* | 7/2010 | Pizzorni et al. ............... 707/756 |
| 7,770,222 | B2* | 8/2010 | Hopen et al. ..................... 726/22 |
| 8,204,969 | B2* | 6/2012 | Carcerano et al. ............ 709/221 |
| 2003/0018699 | A1 | 1/2003 | Matthews et al. |
| 2004/0003389 | A1* | 1/2004 | Reynar et al. ................. 717/178 |
| 2004/0003390 | A1* | 1/2004 | Canter et al. .................. 717/178 |
| 2004/0093593 | A1* | 5/2004 | Jhanwar et al. ............... 717/169 |
| 2004/0125403 | A1 | 7/2004 | Furst et al. |
| 2006/0031371 | A1 | 2/2006 | Uthe |
| 2006/0173993 | A1 | 8/2006 | Henseler et al. |
| 2007/0150478 | A1* | 6/2007 | Cho et al. ......................... 707/10 |
| 2007/0168348 | A1* | 7/2007 | Forsyth ............................ 707/10 |
| 2007/0233698 | A1 | 10/2007 | Sundar et al. |

OTHER PUBLICATIONS

Cohen O. Shwartz, "Assemblies: locating, binding, and deploying", Nov. 2005, p. 1-6 <bind_deploy05.pdf.>.*

(Continued)

*Primary Examiner* — Tuan A Vu
(74) *Attorney, Agent, or Firm* — Chin IP, PLLC; Davin Chin (57) ABSTRACT

An automated arrangement for deploying software updates to a distributed system based on state differences is provided in which a manifest defines a target snapshot of the desired state of the system after it is updated. A snapshot of the current distributed system state is taken and a state difference between the current state and the target state is calculated. A rule-based engine applies pre-defined rules to generate a sequence of actions that when performed will bring the distributed system to the target state. Accordingly, rather than have to focus on how to change the distributed system, software developers and system administrators may instead specify the target distributed system state in the manifest and the present automated deployment arrangement will perform the required actions to deploy the updates and achieve the desired state.

16 Claims, 6 Drawing Sheets

OTHER PUBLICATIONS

Foster, et al., "Grid Services for Distributed System Integration", Retrieved at <<http://www.globus.org/alliance/publications/papers/ieee-cs-2.pdf>>, IEEE, Jun. 2002, pp. 37-46.

Oppenheimer, David, "The importance of understanding distributed system configuration", Retrieved at <<http://roc.cs.berkeley.edu/papsers/dsconfig.pdf>>, pp. 3, date unknown, but prior to the filing of the instant application.

Andersson, Jesper, "A Deployment System for Pervasive Computing", Retrieved at >>http://citeseer.ist.psu.edu/cache/papers/cs/28809/http:zSzzSzwww.itn.liu.sezSz~benlezSzNySumzSzandersson_ICSM00.pdf/andersson00deployment.pdf>>, pp. 10, date unknown, but prior to the filing date of the instant application.

* cited by examiner

AUTOMATED SOFTWARE DEPLOYMENT TRIGGERED BY STATE DIFFERENCES IN DISTRIBUTED SYSTEMS

BACKGROUND

Distributed systems of computing resources are seeing more widespread use as they can often efficiently provide computing services to users who are geographically separated. Performance, reliability, and scalability are typically improved over what can be provided by non-distributed systems. Infrastructure can be deployed and load-balanced to distribute the handling of client requests, and redundant servers on separate machines may be utilized to ensure continuity of service in the event of faults.

Although many distributed systems perform well, system administration and maintenance can present significant challenges. Distributed systems are not always homogenous, and administrators can face a variety of issues relating to differing networking technologies and communication protocols, hardware architectures, operating systems, applications, performance characteristics, and other factors.

The deployment of needed or desired updates in distributed systems, for example, can often be particularly problematic. Current deployment techniques are typically focused on defining and then implementing steps to bring the distributed system to a desired state. The intended goal of software developers and system administrators is to reach the desired state by repeating the same steps to update each object in the distributed system (such as the servers, for example). However, implementation of these methodologies can be time consuming and may be prone to human error. In addition, the aforementioned non-homogeneity of many distributed systems can limit the effectiveness of the methodologies. Such shortcomings may be compounded as the distributed system continues to get updated with each new release.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An automated arrangement is provided for deploying software updates to a distributed system based on state differences in which a manifest defines a target snapshot of the desired state of the system after it is updated. A snapshot of the current distributed system state is taken and a state difference between the current state and the target state is calculated. A rule-based engine applies pre-defined rules to generate a sequence of atomic actions that will bring the distributed system to the target state when performed. Accordingly, rather than having to focus on how to change the distributed system, software developers and system administrators may instead just specify the target distributed system state in the manifest and the present automated deployment arrangement will perform the required actions to deploy the updates and achieve the desired state for the distributed system.

In various illustrative examples, the automated deployment is implemented by an application that can run on an administrator console or other computing platform. The manifest defines a target distributed system state by specifying state variables such as files, registry settings, databases, directory services, permissions, system and other services, web sites, and the like. The manifest may be manually generated, or may be created in an automated manner.

The automated deployment application will capture a snapshot of the current state of the distributed system and compare it to the target state that is defined by the manifest. A rule-based engine implemented by the automated deployment application will generate a deployment sequence of atomic actions based on the calculated difference between the current and target states. Such actions may include copying files, setting security permissions, etc. Another snapshot is taken of the distributed system state after the actions are performed (i.e., post-deployment), and that current state is compared with the target state defined by the manifest. If no difference between the current state and target state is found, then the distributed system has reached the desired state.

Advantageously, the present arrangement automates the update process which can significantly reduce the workload on developers and administrators by eliminating the repetitious and error prone manual steps that are usually needed to deploy updates in a distributed system. By using the concept of system state, the present arrangement is results-oriented and can avoid the necessity to deploy updates incrementally. Thus, for example, a distributed system can be taken from its initial state directly to the target state without having to deploy all the intermediate releases of software updates as would typically be done using the step-by-step deployment techniques. Snapshots of the distributed system can also be periodically taken and be utilized to verify system health.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
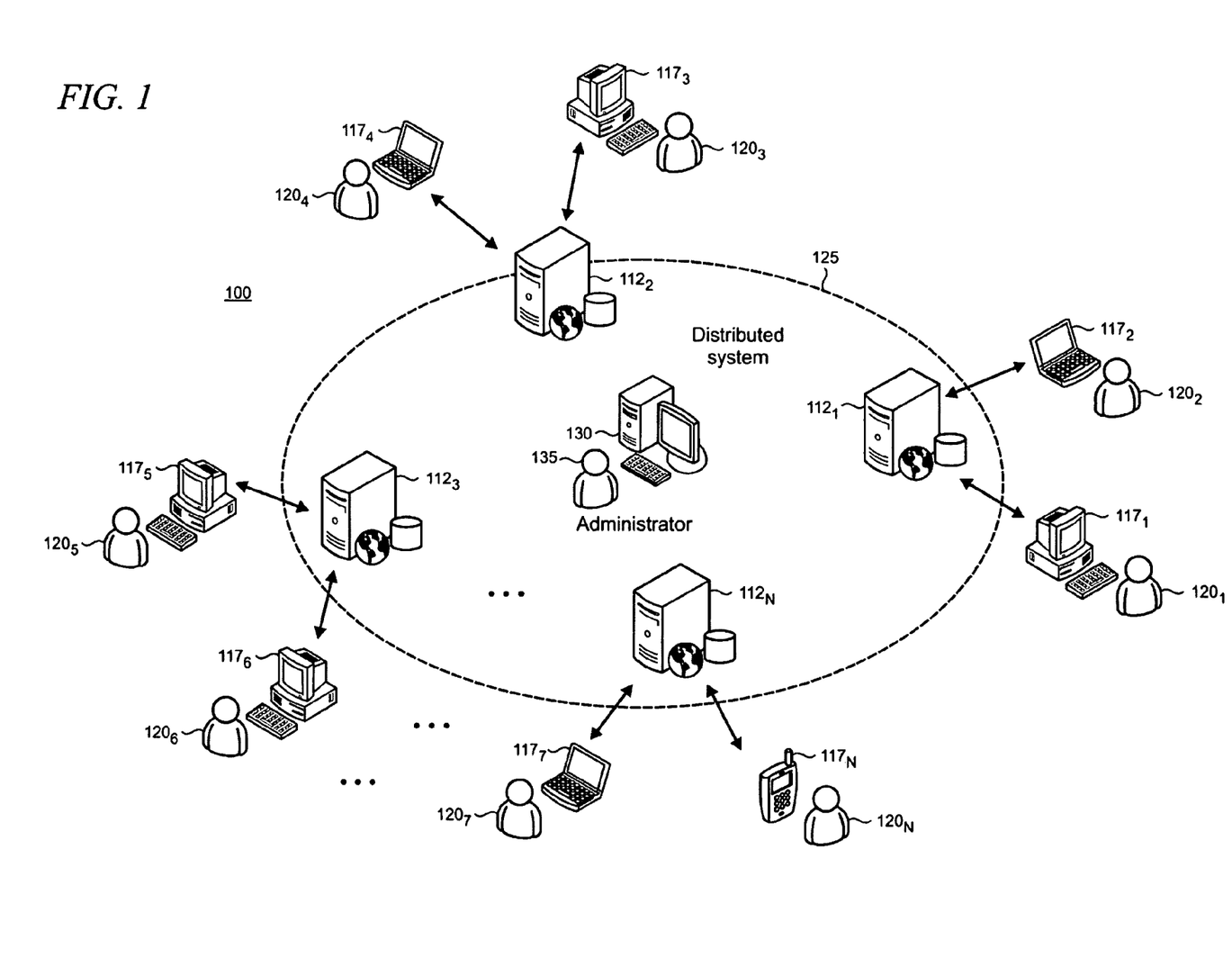
FIG. 1 shows an illustrative distributed system environment that supports multiple servers and clients.

FIG. 1 shows an illustrative distributed system environment 100 that supports multiple servers 112$_{1, 2 \ldots N}$ and client computing devices 117$_{1, 2 \ldots N}$. In this example, the client computing devices 117 include a variety of desktop PCs (personal computers), laptop PCs, and mobile devices that are utilized by respective users $120_{1, 2} \ldots N$. The servers 112 are part of a distributed system 125 that may be utilized to provide one or more of a variety of computing services, features, or functionalities. For example, the distributed system 125 may be used to provide on-line services to the users 120. In alternative usage scenarios, the distributed system may support enterprise operations of a business, for example, or support a mix of services and business systems. Accordingly, the servers 112 can be configured to serve web pages or files, provide access to databases or knowledge-based systems, support remote access and operations, support e-mail, and the like.

The servers 112 in the distributed system 125 can be (but do not necessarily need to be) physically co-located. The particular physical distribution of the servers 112 and related IT (information technology) assets, support systems, administrative personnel, etc. used in a given system will typically be dependent upon the requirements of the implementation such as the number and location of clients, the types of networks utilized, the tasks users need to perform, performance objectives such as quality of service and minimization of network latency, and the like. Some functionality or data provided by the distributed system 125 may also be replicated and/or cached across multiple servers 112 to increase availability and provide redundancy in the event of server or network failures. However, not all the servers 112 necessarily need to support data replication or caching.

An administrator console 130 ("admin console") is also supported in the environment 100. The admin console 130 is typically provided to enable an administrator 135 to engage in configuration and management of the distributed system 125. Such configuration and management may include, for example, creating and maintaining user privileges and permissions, monitoring network operations and resources, generating reports, setting policies for security and auditing, and the like. In this example, as described in more detail in the text accompanying FIG. 3, the admin console 130 also is configured to run an automated deployment application.

In order to create a distributed system that meets its particular design goals, the servers 112 can typically be expected to vary by type, the applications supported on the servers, settings, configuration, and operating system parameters, among other characteristics. This non-homogeneity of the server and other infrastructure can make it difficult to deploy software updates in the distributed system 125 when using conventional deployment techniques.

Figure 2:
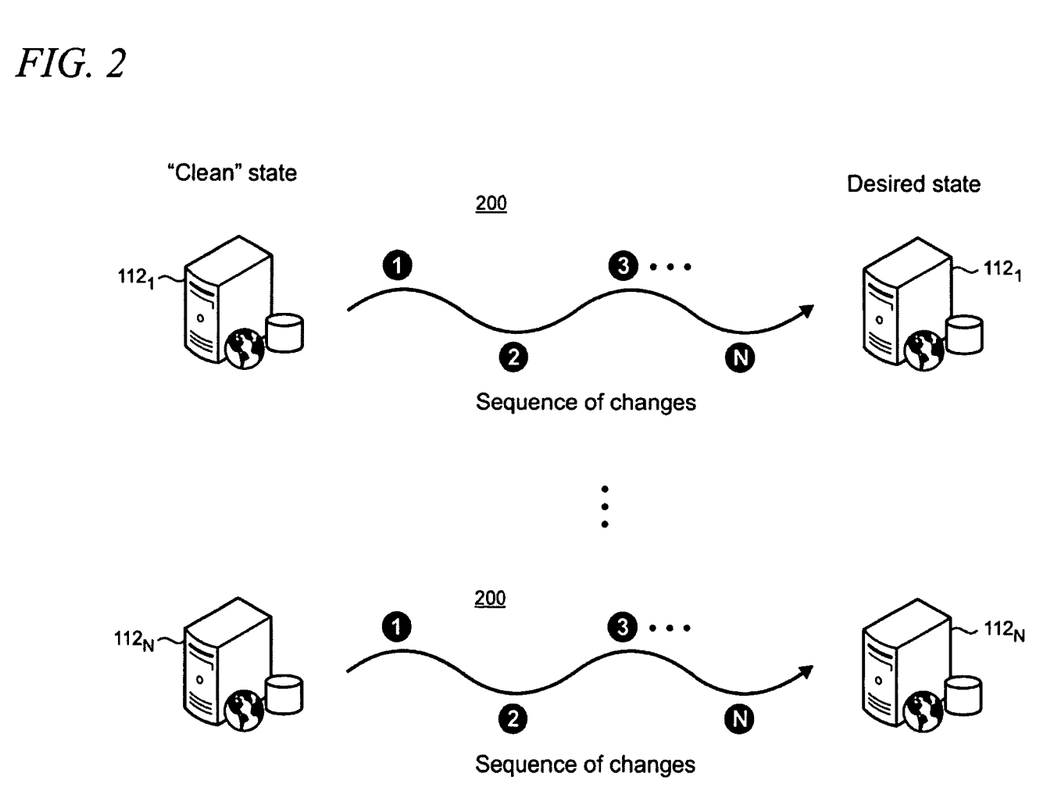
FIG. 2 is a diagram showing a sequence of changes that are conventionally utilized to take the servers in the distributed system from a clean state to a desired state.

FIG. 2 is a diagram showing a sequence of changes that are conventionally used to take the servers 112 in the distributed system 125 from a "clean" state (i.e., some known base or initial state) to a desired state. With such existing techniques, the sequence includes a number of steps 1, 2 . . . N that, for example, are applied to one of the servers (represented by server $112_1$) in an attempt to drive the server to the desired state. The sequence of changes 200 will be repeated with the remaining servers $112_{2 \ldots N}$ in the distributed system 125 to try to get the entire system to the desired state.

It is noted that the sequence of changes 200 is intended to implement a strategy that is focused on how the update is deployed. In other words, conventional deployment techniques will frequently use a step-by-step approach with the underlying assumptions that if every server starts at the same clean state and the exact same sequence of changes is implemented at every server, then the outcome will be a distributed system that is in the desired state.

However, such conventional deployment techniques do not achieve the desired state when implemented in most cases. External factors, human errors, the extent to which bug fixes have been made, server platform and software differences and interdependencies, to name just a few illustrative factors, can make it difficult for the exact same sequence of changes to work as intended in actual practice. In addition, executing the step-by-step approach can often be very labor intensive.

The difficulties in achieving the desired state may be further exacerbated as the distributed system continues to get updated with each new release of software. As the distributed system evolves, for example, it can become virtually impossible to build a testing environment that reflects the deployment environment with sufficient accuracy to allow an effective sequence of changes to be developed.

By comparison to conventional techniques which are concerned with the mechanics of how distributed systems are updated, the present automated arrangement for deploying software updates to a distributed system focuses on what the distributed system state is desired to be. Thus, instead of being concerned with how to change the system state, the present arrangement enables software developers and/or distributed system administrators to specify what the desired system state should be using a results-oriented approach. Once so specified, the present arrangement will handle the deployment of updates in an automated manner to achieve the specified state.

Figure 3:
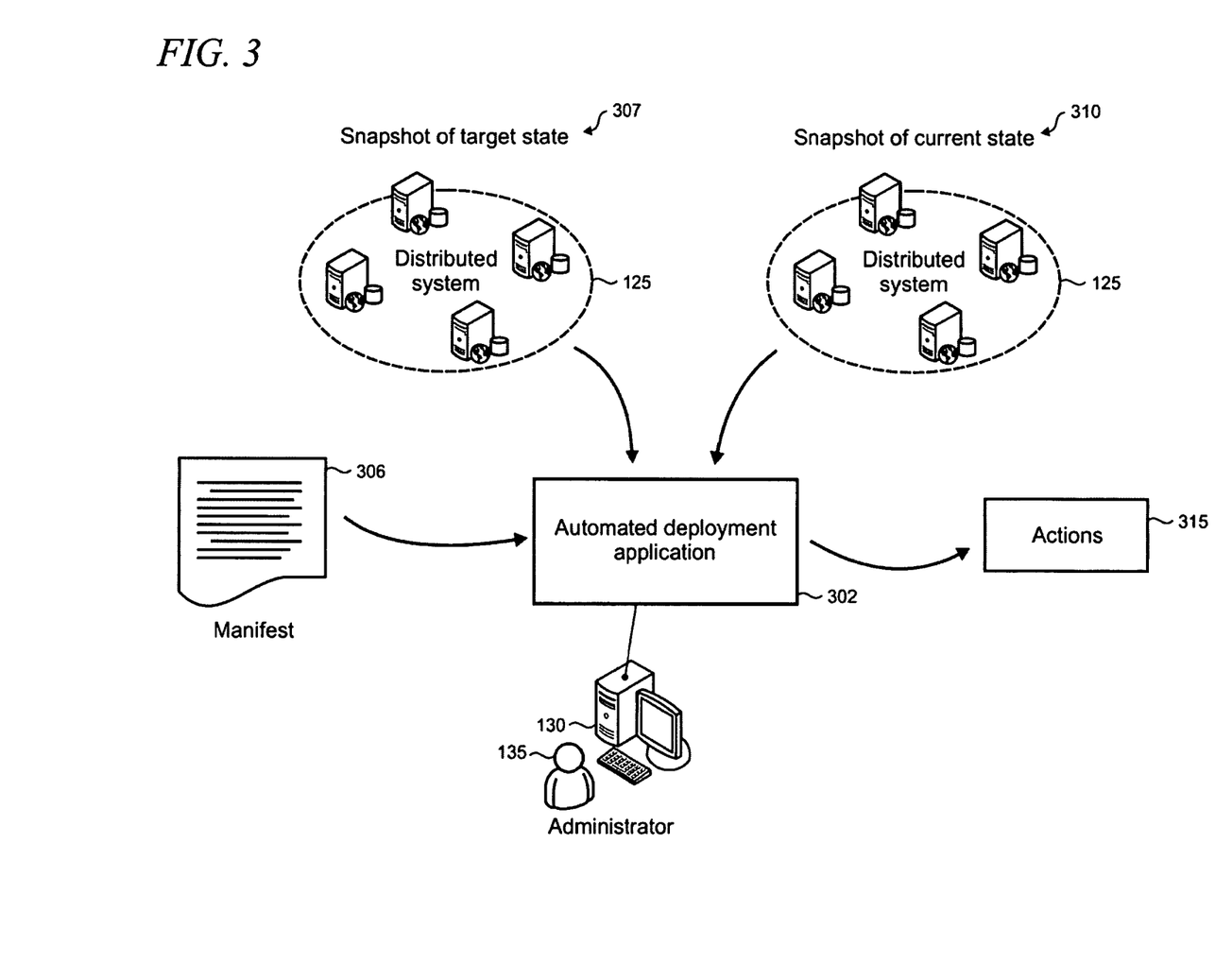
FIG. 3 shows an illustrative automated deployment application that may run on an administrator console.

This approach is shown in FIG. 3 where an automated deployment application 302 is operated in the context of the distributed system 125 that is shown in FIG. 1 and described in the accompanying text. In this example, the automated deployment application 302 is configured to run as executable code on the admin console 130. However, support of the automated deployment application 302 by the admin console 130 is intended to be illustrative. In alternative arrangements, the automated deployment application 302 can be executed using computing platforms including, for example, those supported by developers, third party service providers, and the like.

At a high level, the automated deployment application 302 is configured to employ a manifest 306, which defines a system state, as an input. Using the manifest 306 as a guide, the automated deployment application 302 will capture a snapshot 307 of the target state of the distributed system 125 that reflects the desired state after a particular update is deployed. A snapshot 310 of the current state of the distributed system (i.e., the system state prior to the deployment of the update) is also captured by the automated deployment application 302 as an input. The application 302 will compare the two snapshots 307 and 310, calculate the difference between the states, and employ a rule-based engine to generate a set of atomic actions 315 in response to the calculated difference. After the actions 315 are executed, the distributed system 125 will have reached the desired state as defined in the manifest 306.

Generally, the manifest 306 reflects all of the application-related states and variables within the distributed system 125. The manifest 306 is typically broken down by server role that logically groups the required components needed to perform specific functions in the distributed system.

Figure 4:
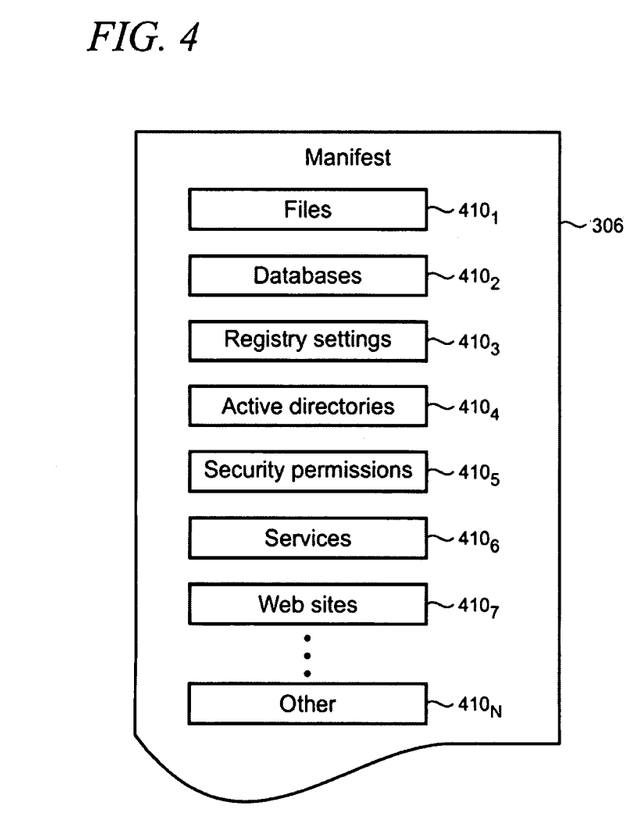
FIG. 4 shows details of an illustrative manifest that is used to define a target state for the distributed system.

More specifically in this example, as shown in FIG. 4, the manifest 306 describes the various attributes 410 that are intended to be deployed in the distributed system 125 according to server role (i.e., by the specific tasks that each server is intended to perform within the distributed system). The manifest 306 may be generated in various ways. For example, it may be manually created by filling out a form, or the manifest could be captured in an automated manner in a test environment. For example, the manifest 306 may be automatically generated by specifying attributes that may be added during coding to the definition of one or more classes in a managed code assembly (e.g., under Microsoft Corporations .NET Framework). The manifest 306 may be expressed using XML (extensible markup language) or a similar document.

In this illustrative example, the attributes in the manifest 306 include files $410_1$, databases $410_2$, registry settings $410_3$, active directories $410_4$ (i.e., directory/identity services), security and other permissions $410_5$, services $410_6$, web sites $410_7$, and other elements $410_N$. It is emphasized that these elements are intended to be illustrative and that not all need to be used in a given implementation. In addition, other elements may also be specified for deployment as may be necessary to meet the needs of a particular implementation.

Figure 5:
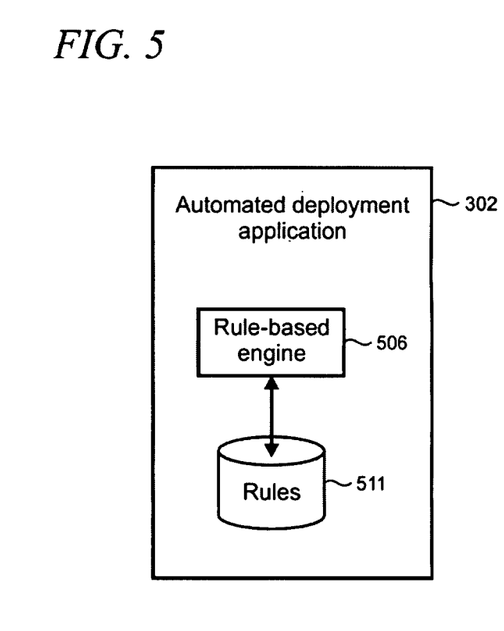
FIG. 5 shows details of the automated deployment application.
Figure 6:
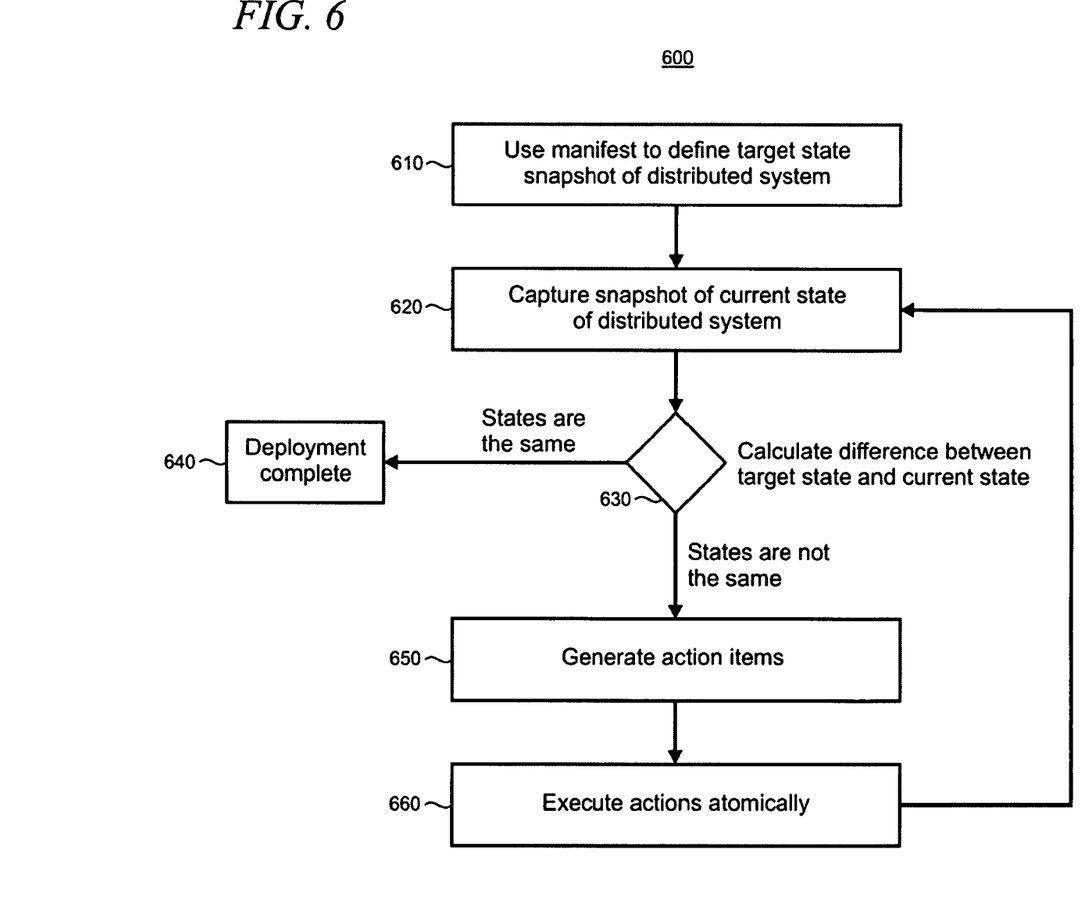
FIG. 6 shows a flowchart of an illustrative method for performing automated deployment of updates based on state differences.

FIG. 5 shows details of the automated deployment application 302. As shown, a rule-based engine 506 is implemented in the application 302. A rules database 511 or other store is also implemented. The rule-based engine 506 will be utilized to perform a method 600, as shown in the flowchart of FIG. 6, in order to bring the distributed system 125 to the desired state.

The method 600 begins by the application 302 capturing the snapshot 307 of the target state of the distributed system 125. As noted above, the target state is defined by the manifest 306 (as indicated by reference numeral 610). The application 302 will then capture the snapshot 310 of the current state of the distributed system 125 (620).

The rule-based engine 506 will then calculate a difference between the target state and the current state of the distributed system 125 (630). If the calculated difference is zero, indicating that the states are the same, then the deployment is complete (640). Otherwise, if the calculated difference is non-zero, which means the target and current states are not the same, then the rule-based engine 506 will apply rules 511 from the database to generate a set of action items (650) and a sequence in which they are performed.

The action items are executed atomically in the distributed system 125 (660). By being atomic, either all of the actions will be performed successfully to transform the state of the distributed system completely or all the actions are terminated in a way that the state of the system is left unchanged (i.e., the system and associated data will retain no effect of any of the actions having been performed). Thus, atomic execution implies that there are no intermediate states so that the outcome of the actions is either all or nothing.

After the actions are performed, another snapshot of the distributed system 125 can be taken (620) and the difference between the target and current states calculated again (630). The difference at this point should be zero which indicates that the distribute system has reached the desired target state.

Figure 7:
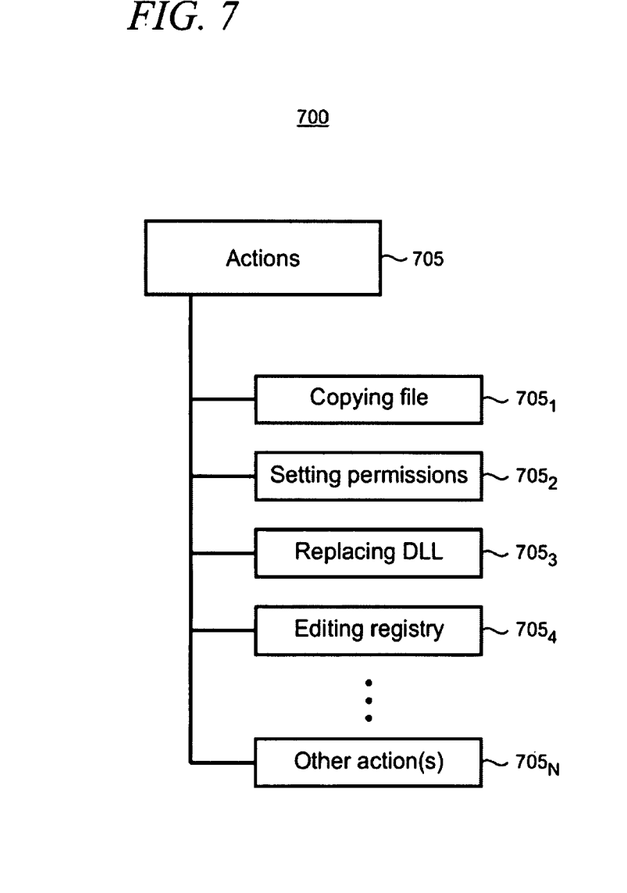
FIG. 7 shows an illustrative taxonomy of atomic actions that may be performed to bring a distributed system from a current state to the target state that is defined by the manifest.

FIG. 7 shows an illustrative taxonomy 700 of atomic actions $705_{1...N}$ that may be performed to bring the distributed system 125 (FIG. 1) from a current state to the target state that is defined by the manifest 306 (FIG. 3). As shown in FIG. 7, the actions 705 include copying files $705_1$, setting permissions $705_2$, replacing a DLL (dynamic-link library) $705_3$, editing a registry setting $705_4$, and other actions $705_N$ that would be needed to transform the current state to the target state. It is emphasized that the actions 705 are intended to be illustrative and that other actions can be utilized as may be required to meet the needs of a particular implementation.

Figure 8:
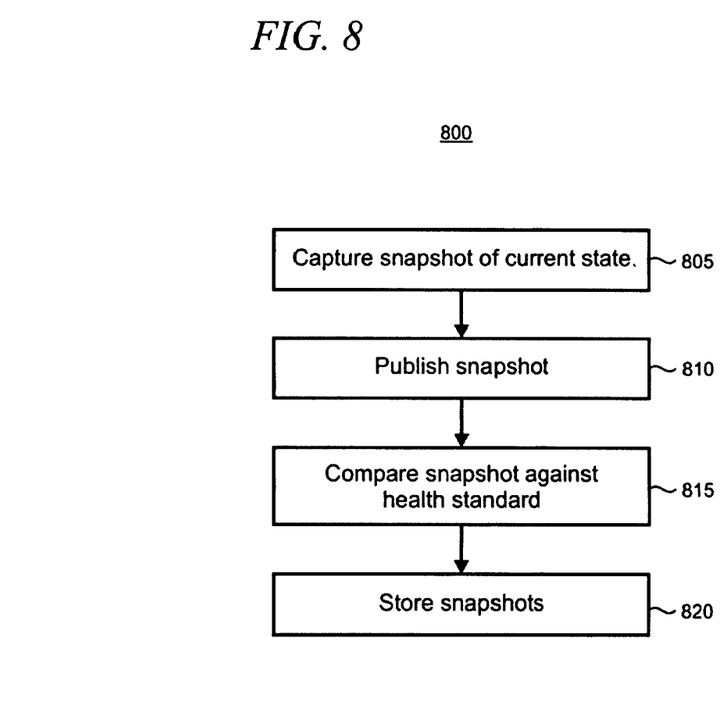
FIG. 8 shows an illustrative method for periodically verifying the health of the distributed system.

FIG. 8 shows an illustrative method 800 for periodically verifying the health of the distributed system 125 (FIG. 1). The method starts by capturing a snapshot of the distributed system at some arbitrary time (as indicated by reference numeral 805). The application can then publish the snapshot (810) to subscribers (i.e., client machines, users, developers, etc.) who can check various attribute values and/or other parameters in the snapshot and compare them (815), for example, to some standard or other known good configuration to ascertain the health of the distributed system 125. For example, a subscriber can check a particular value or parameter of interest such as registry entry, a permission for a certificate or other object, a DLL version, etc. By presenting the distributed system state in a snapshot, the state data is organized and coherent and can be expected to save considerable time when performing checks and analyses, particularly when dealing with distributed systems that are large and/or complex.

The capture can be periodically iterated and the snapshots stored (820) so that the evolution of the state of the distributed system can be observed over time. Various types of analyses can be applied to the stored snapshots, for example, to identify trends, perform sensitivity analysis, make predictions, identify areas of vulnerability or concern, and the like. In a similar manner, the stored snapshots can be utilized for performance monitoring or benchmarking of the distributed system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An automated method for deploying changes to a distributed server system, comprising:

capturing, by a rule-based engine of an administration device for the distributed server system, a current state of the distributed server system by retrieving a first snapshot that is indicative of values of one or more attributes associated with computing devices in the distributed server system including at least one of files, databases, registry entries, permissions, databases, active directories, or services, wherein the distributed server system includes multiple non-homogeneous server computing devices with at least two of the non-homogeneous server computing devices adapted to provide redundancy for each other;

comparing, by the rule-based engine, the current state of the distributed server system against a target state of the distributed server system to generate a difference, the target state being defined by a manifest that describes a collection of attributes, the collection of attributes including values for at least one of files, databases, registry entries, permissions, databases, active directories, or services, that specifies target values for the one or more attributes of the collection of attributes that are pertinent to the at least two computing devices of the distributed server system, wherein the manifest was previously generated from data automatically captured from a software test environment, and wherein the manifest is organized by server roles of the at least two computing devices and is logically grouped according to required components needed to perform specific functions of the server roles;

generating, by the rule-based engine, a set of atomic actions using rules retrieved from a rules database, such that upon deployment the generated atomic actions are either all successfully executed to transform the distributed server system from the current state to the target state or, if any of the actions are not successfully executed, leave the distributed system in the current state such that the distributed server system is not transformed to an intermediate state that is between the current state and the target state;

automatically deploying the set of actions to the at least two computing devices of the distributed server system;

capturing, by the rule-based engine, a post-deployment state of the distributed server system including a second snapshot indicative of post-deployment values of one or more attributes of the distributed server system on which the set of actions have been deployed; and comparing the post-deployment state of the distributed server system against the target state of the distributed server system to verify, based on a lack of difference between the first snapshot and the second snapshot, that the post-deployment state is the same as the target state and that the at least two computing devices of the distributed server system have been transformed to the target state in accordance to the server roles in the manifest.

2. The automated method of claim 1, wherein the atomic actions comprise at least one of setting permissions, editing a registry entry, or replacing a DLL.

3. The automated method of claim 1, further comprising: generating a sequence in which actions of the set of actions are deployed.

4. The automated method of claim 1, wherein the distributed server system provides online applications or is utilized in an enterprise computing environment.

5. The automated method of claim 1, wherein the previous generation of the manifest from data automatically captured from a software test environment included:
automatically generating the manifest, including:
adding the attributes to a definition of a class in a managed code assembly.

6. A computing device having a processor that is configured to execute instructions to perform operations that deploy software updates to a distributed server system that includes multiple non-homogeneous server computing devices with at least two of the non-homogeneous server computing devices configured to provide redundancy for each other, the operations including:

capturing, by a rule-based engine of an administration device for the distributed server system, a current state of the distributed server system by retrieving a first snapshot that is indicative of values of one or more attributes associated with computing devices in the distributed server system including at least one of files, databases, registry entries, permissions, databases, active directories, or services, wherein the distributed server system includes multiple non-homogeneous server computing devices with at least two of the non-homogeneous server computing devices adapted to provide redundancy for each other;

comparing, by the rule-based engine, the current state of the distributed server system against a target state of the distributed server system to generate a difference, the target state being defined by a manifest that describes a collection of attributes, the collection of attributes including values for at least one of files, databases, registry entries, permissions, databases, active directories, or service, that specifies target values for the one or more attributes of the collection of attributes that are pertinent to the at least two computing devices of the distributed server system, wherein the manifest was previously generated from data automatically captured from a software test environment, and wherein the manifest is organized by server roles of the at least two computing devices and is logically grouped according to required components needed to perform specific functions of the server roles;

generating, by the rule-based engine, a set of atomic actions using rules retrieved from a rules database, such that upon deployment the generated atomic actions are either all successfully executed to transform the distributed server system from the current state to the target state or, if any of the actions are not successfully executed, leave the distributed system in the current state such that the distributed server system is not transformed to an intermediate state that is between the current state and the target state;

automatically deploying the set of actions to the at least two computing devices of the distributed server system;

capturing, by the rule-based engine, a post-deployment state of the distributed server system including a second snapshot indicative of post-deployment values of one or more attributes of the distributed server system on which the set of actions have been deployed; and comparing the post-deployment state of the distributed server system against the target state of the distributed server system to verify, based on a lack of difference between the first snapshot and the second snapshot, that the post-deployment state is the same as the target state and that the at least two computing devices of the distributed server system have been transformed to the target state in accordance to the server roles in the manifest.

7. The one or more computer-readable storage media of claim 6, wherein the atomic actions comprise at least one of setting permissions, editing a registry entry, or replacing a DLL.

8. The one or more computer-readable storage media of claim 6, wherein the operations further include:
generating a sequence in which actions of the set of actions are deployed.

9. The one or more computer-readable storage media of claim 6, wherein the application is further configured to read the target state from the manifest.

10. The one or more computer-readable storage media of claim 9, wherein the distributed server system provides online applications or is utilized in an enterprise computing environment.

11. The one or more computer-readable storage media of claim 9, wherein the previous generation of manifest from data automatically captured from a software test environment included:
automatically generating the manifest, including:
adding the attributes to a definition of a class in a managed code assembly.

12. An automated method operable on a computing device for managing health of a distributed server system, the method comprising:
verifying the health of the distributed system as the distributed server system changes over time, including iteratively:
capturing, by the computing device, of a current state of the distributed server system by retrieving a first snapshot that is indicative of values of one or more attributes associated with computing devices in the distributed server system including at least one of files, databases, registry entries, permissions, databases, active directories, or services, wherein the distributed server system includes multiple non-homogeneous server computing devices with at least two of the non-homogeneous server computing devices adapted to provide redundancy for each other; and publishing, by the computing device, the first snapshot to enable a rule-based engine of an administration device for the distributed server system to perform operations, that include:

comparing, by the rule-based engine, the current state of the distributed server system against a target state of the distributed server system to generate a difference, the target state being defined by a manifest that describes a collection of attributes, the collection of attributes including values for at least one of files, databases, registry entries, permissions, databases, active directories, or services, that specifies target values for the one or more attributes of the collection of attributes that are pertinent to the at least two computing devices of the distributed server system, wherein the manifest was previously generated from data automatically captured from a software test environment, and wherein the manifest is organized by server roles of the at least two computing devices and is logically grouped according to required components needed to perform specific functions of the server roles;

generating, by the rule-based engine, a set of atomic actions using rules retrieved from a rules database, such that upon deployment the generated atomic actions are either all successfully executed to transform the distributed server system from the current state to the target state or, if any of the actions are not successfully executed, leave the distributed system in the current state such that the distributed server system is not transformed to an intermediate state that is between the current state and the target state;

automatically deploying the set of actions to the at least two computing devices of the distributed server system;

capturing, by the rule-based engine, a post-deployment state of the distributed server system including a second snapshot indicative of post-deployment values of one or more attributes of the distributed server system on which the set of actions have been deployed; and comparing the post-deployment state of the distributed server system against the target state of the distributed server system to verify, based on a lack of difference between the first snapshot and the second snapshot, that the post-deployment state is the same as the target state and that the at least two computing devices of the distributed server system have been transformed to the target state in accordance to the server roles in the manifest.

13. The automated method of claim 12, wherein the manifest defines values for at least some of the one or more attributes that are indicative of good health.

14. The automated method of claim 12, wherein the method further comprises:
archiving the first snapshots.

15. The automated method of claim 14, wherein the method further comprises:
performing analysis or performance monitoring based on the archived first snapshots.

16. The automated method of claim 12, wherein the operations further include:
generating a sequence in which actions of the set of actions are deployed.

* * * * *